Patented Sept. 8, 1931

1,822,561

UNITED STATES PATENT OFFICE

ERNEST R. BRIDGWATER, OF WILMINGTON, DELAWARE, ASSIGNOR TO E. I. DU PONT DE NEMOURS & COMPANY, OF WILMINGTON, DELAWARE, A CORPORATION OF DELAWARE

RUBBER PRODUCT AND PROCESS OF PREPARING THE SAME

No Drawing.   Application filed April 12, 1929. Serial No. 354,712.

This invention relates to a process for heat treating rubber and similar materials and to the products obtained thereby, being more particularly directed to the use of certain materials whose function is to prevent scorching in the presence of powerful organic accelerators.

It has long been known that litharge, when used in small quantities in conjunction with accelerators of the above mentioned type, has the effect of reducing their activity at temperatures that are encountered during factory processing and litharge is therefore widely used for the purpose of preventing scorching in the presence of such accelerators. Litharge is, however, objectionable because it is converted during vulcanization to lead sulfide which is black and the rubber compound is therefore darkened.

The primary object of the present invention is therefore to provide means of retarding or inhibiting the action of powerful organic accelerators under conditions that are encountered during factory processing without inhibiting their action at the higher temperatures that are used for vulcanization and without adversely affecting the quality of the finished product. Another object of the invention is to provide means of preventing scorching when active organic accelerators are used, without using a material that will appreciably darken or discolor the vulcanized rubber.

I have found that various materials, which do not tend to materially darken the rubber as does litharge and which have not been heretofore employed in this connection are exceptional retarding agents. Thus, cadmium oxide, cadmium hydroxide and the cadmium salts, particularly the salts of weak acids such as the salts of fatty acids, as cadmium oleate, cadmium stearate and cadmium acetate, as well as various other compounds of cadmium are very effective in preventing the scorching of rubber mixes containing accelerators of the general type described below. Obviously other compounds than the preferred cadmium compounds such as metallic oxides and salts which do not combine with sulfur to form black or dark colored products may also be employed with success as, for example, arsenic trioxide.

I have discovered that the new retarding agents may be employed with advantage in connection with many accelerators. One of the most important groups of accelerators having this characteristic is the group comprising the derivatives of dithiocarbamic acid, that is, accelerators containing the group

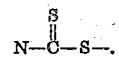

The principal commercial accelerators falling in this class are the substituted thiuram, di- or thiurammono-sulfides such as tetramethyl-thiurammono-sulfide and tetramethylthiuram disulfide. The retarding agents of my invention also prevent scorching when used in conjunction with accelerators derived from the reaction of carbondisulfide with an aldehydeamine condensate such for example as the well known accelerators derived from aniline-butyraldehyde and carbon bisulfide.

In order to better disclose the invention in detail, examples are given below of specific applications of the new retarding agents. Since the compounds of cadmium represent the preferred class of retarding agents the invention will hereinafter be disclosed with more particular reference to these compounds but it is to be distinctly understood that the invention is not to be limited thereto. The accelerators employed in the examples illustrate the invention as applied to accelerators of the substituted thiurammonosulfide type and to accelerators of the class derived from the reaction of carbon disulfide with an aldehyde amine condensate. Accelerators of these two types, and more especially the substituted thiurammonosulfides, since the latter have been found to be peculiarly adapted for use with cadmium compounds, represent the preferred classes of accelerators and therefore have been chosen for purposes of illustration but, as already made clear, various other accelerators may be employed. It is also to be understood that the conditions, proportions, etc., given in the following examples are susceptible of wide variation, and that an infinite variety of other compounding ingredients may be added, all without departing from the scope and spirit of my invention.

*Example 1*

The following formula illustrates the manner of using cadmium compounds in conjunction with tetramethylthiurammonosulfide:

| | |
|---|---|
| Smoked sheets | 100.0 |
| Zinc oxide | 5.0 |
| Sulfur | 2.5 |
| Tetramethylthiurammonosulfide | 0.2 |

The table shown below gives the physical properties of this compound when vulcanized for various periods of time at 227° F. and at 259° F., no retarding agent being used. It also shows the effect of adding 0.02% of cadmium oxide to the compound and the effect of adding cadmium oleate, cadmium acetate, cadmium hydroxide and cadmium sulfide. The four last mentioned compounds were used in molecularly equivalent quantities, that is, in such amounts that the actual cadmium content is the same.

| Retarding agent | Cure | Stress at 500% elongation | Tensile strength | Per cent elongation at break |
|---|---|---|---|---|
| | | Lbs. per sq. in. | Lbs. per sq. in. | |
| None | 60 x 227° F. | 325 | 3,425 | 835 |
| | 90 x 227° F. | 725 | 3,900 | 745 |
| | 15 x 259° F. | 150 | 2,700 | 870 |
| | 20 x 259° F. | 375 | 3,225 | 785 |
| | 30 x 259° F. | 600 | 3,250 | 730 |
| Cadmium oxide 0.02% | 60 x 227° F. | Does not cure. | | |
| | 90 x 227° F. | 450 | 3,475 | 780 |
| | 15 x 259° F. | 175 | 2,600 | 920 |
| | 20 x 259° F. | 275 | 3,300 | 865 |
| | 30 x 259° F. | 425 | 3,225 | 780 |
| Cadmium oleate 0.0613% | 60 x 227° F. | Does not cure. | | |
| | 90 x 227° F. | 475 | 3,600 | 770 |
| | 15 x 259° F. | 150 | 2,100 | 875 |
| | 20 x 259° F. | 400 | 3,525 | 820 |
| | 30 x 259° F. | 550 | 3,350 | 770 |
| Cadmium acetate 0.0599% | 60 x 227° F. | Does not cure. | | |
| | 90 x 227° F. | 325 | 3,350 | 850 |
| | 15 x 259° F. | Does not cure. | | |
| | 20 x 259° F. | 225 | 2,850 | 855 |
| | 30 x 259° F. | 425 | 3,225 | 780 |
| Cadmium hydroxide 0.0228% | 60 x 227° F. | Does not cure. | | |
| | 90 x 227° F. | 525 | 3,950 | 780 |
| | 15 x 259° F. | 200 | 2,475 | 895 |
| | 20 x 259° F. | 350 | 3,275 | 820 |
| | 30 x 259° F. | 525 | 3,425 | 770 |
| Cadmium sulfide 0.0225% | 60 x 227° F. | 225 | 2,750 | 880 |
| | 90 x 227° F. | 525 | 3,625 | 765 |
| | 15 x 259° F. | 200 | 2,725 | 850 |
| | 20 x 259° F. | 372 | 3,300 | 800 |
| | 30 x 259° F. | 600 | 3,775 | 775 |

227° F. is approximately the maximum temperature to which rubber compounds are subjected during mixing, calendering and other factory processes which precede vulcanization. It will be noted that the compound containing no retarding agent is well cured in 60 minutes at 227° F. However, when cadmium oxide, cadmium oleate, cadmium acetate or cadmium hydroxide are added in the amounts indicated in the table the compound does not cure at all in 60 minutes at 227° F. It is also significant to note that cadmium sulfide, which is not capable of reacting with hydrogen sulfide, does not function as a retarding agent of low temperatures in the rubber compound used for this test.

259° is a common vulcanizing temperature for compounds containing the accelerator used in the above example. It will be noted that the cadmium compounds, with the exception of the sulfide, retard the cure at 259° F. to a slight extent at the beginning of the cure only. This is clearly shown by the physical properties of the 15 minute cures at 259° F. The correct technical cure for this compound is approximately 20 minutes at 259° F. and in the proportions employed none of the cadmium compounds, with the exception of the acetate, have an appreciable effect on the physical properties of the compound when cured for 20 minutes at 259° F. The fact that cadmium acetate has a slightly greater retarding effect than an equivalent amount of cadmium oxide is probably due to the influence of the acetate radical. By employing slightly less quantities of the acetate results similar to those obtained from the other agents employed may be obtained. In other words, the above example clearly indicates that cadmium compounds of the type described retard the vulcanization of rubber compounds containing this accelerator at the inception of the cure and especially at low temperatures but they have no influence on the time required to produce a well cured stock at 259° F. Neither do they affect the physical properties of the cured stock.

*Example 2*

The following table shows vulcanization tests on a compound accelerated with butyraldehyde-aniline-carbondisulfide with and without cadmium oxide. The following basic formula was used for these tests:

| | |
|---|---|
| Smoked sheets | 100.0 |
| Zinc oxide | 5.0 |
| Sulfur | 3.0 |
| Aniline - carbondisulfide - butyraldehyde | 1.0 |

The table below shows the results of physical tests on this compound when vulcanized at 227° F. and at 259° F., also tests on an identical compound excepting that 0.25 parts of cadmium oxide is added:

| Retarding agent | Cure | Stress at 500% elongation | Tensile strength | Per cent elongation at break |
|---|---|---|---|---|
| | | Lbs. per sq. in. | Lbs. per sq. in. | |
| None | 45 x 227° F. | 125 | 1,550 | 925 |
| | 60 x 227° F. | 125 | 1,975 | 910 |
| | 75 x 227° F. | 175 | 2,250 | 900 |
| | 90 x 227° F. | 200 | 2,625 | 870 |
| | 10 x 259° F. | 200 | 2,200 | 855 |
| | 20 x 259° F. | 350 | 3,150 | 820 |
| | 30 x 259° F. | 450 | 3,450 | 800 |
| Cadmium oxide 0.25% | 45 x 227° F. | Does not cure. | | |
| | 60 x 227° F. | | 700 | 920 |
| | 75 x 227° F. | 50 | 800 | 890 |
| | 90 x 227° F. | 50 | 1,675 | 955 |
| | 10 x 259° F. | 75 | 1,150 | 910 |
| | 20 x 259° F. | 225 | 2,325 | 875 |
| | 30 x 259° F. | 225 | 2,900 | 855 |

It will be noted that the rate of vulcanization of the compound containing cadmium oxide is much slower at 227° F. than that of the compound in which no retarding agent was used. The compound containing cadmium oxide gave a good cure in 30 minutes at 259° F. although the rate of cure at 259° F. was somewhat less than that of the compound containing no cadmium oxide. The percentage of cadmium oxide used in these tests was rather high. A slightly lower percentage should be used in case one desires to retard the cure of a rubber compound containing this accelerator at the temperatures encountered during factory processing but to avoid retarding the cure at 259° F. The percentage of any accelerator required for any rubber compound must be determined in each case, as is well known, by the nature of the other ingredients of the compound and the conditions of vulcanization. In the same way, the percentage of an anti-scorching compound such as cadmium oxide is dependent upon the percentage of accelerator, the nature of the other ingredients of the compound and the conditions under which the compound is to be vulcanized. The optimum proportions can be determined in any given instance by a simple experiment.

*Example 3*

Cadmium compounds are also of value when used in conjunction with various accelerator combinations. It is well known that combinations of accelerators often give better results than can be obtained when either of the accelerators in question is used alone. However, many accelerator combinations have a greater tendency to cause scorching than either of the accelerators used alone which is, of course, highly disadvantageous. Cadmium compounds may be employed to overcome this outstanding shortcoming of accelerator combinations. The following illustrates the application of my invention to a typical compound containing more than one accelerator.

| | |
|---|---|
| Smoked sheets | 100.0 |
| Zinc oxide | 5.0 |
| Sulfur | 2.0 |
| Tetramethylthiurammonosulfide | 0.2 |
| Butyraldehyde-aniline-carbondisulfide | 0.2 |

The following table shows the physical properties of vulcanizates at 227° F. and at 259° F. The table also shows the effect of adding 0.02% and 0.05% of cadmium oxide to the above compound:

| Retarding agent | Cure | Stress at elongations of— | | Tensile strength | Per cent elongation at break |
|---|---|---|---|---|---|
| | | 400% | 600% | | |
| | | Lbs. per sq. in. | Lbs. per sq. in. | Lbs. per sq. in. | |
| None | 30 x 227° F. | 225 | 1,000 | 3,500 | 800 |
| | 45 x 227° F. | 375 | 1,875 | 3,975 | 730 |
| | 60 x 227° F. | 475 | 2,250 | 4,075 | 690 |
| | 10 x 259° F. | 225 | 1,050 | 3,550 | 780 |
| | 20 x 259° F. | 450 | 1,950 | 4,100 | 725 |
| | 30 x 259° F. | 400 | 1,800 | 3,525 | 710 |
| Cadmium oxide, 0.02% | 30 x 227° F. | 75 | 325 | 1,975 | 835 |
| | 45 x 227° F. | 250 | 1,075 | 4,025 | 810 |
| | 60 x 227° F. | 350 | 1,750 | 4,475 | 755 |
| | 10 x 259° F. | 150 | 550 | 3,100 | 865 |
| | 20 x 259° F. | 375 | 1,550 | 4,100 | 755 |
| | 30 x 259° F. | 375 | 1,600 | 3,625 | 720 |
| Cadmium oxide, 0.05% | 30 x 227° F. | Does not cure. | | | |
| | 45 x 227° F. | 125 | 450 | 2,575 | 865 |
| | 60 x 227° F. | 225 | 925 | 3,825 | 820 |
| | 10 x 259° F. | 75 | 350 | 2,425 | 990 |
| | 20 x 259° F. | 275 | 1,225 | 3,700 | 760 |
| | 30 x 259° F. | 400 | 1,650 | 3,675 | 725 |

It will be noted that the compound containing 0.05 parts of cadmium oxide does not cure at all in 30 minutes at 227° F. The one containing 0.02 parts is badly undercured under those conditions while the one containing no cadmium oxide is very well cured. In 45 minutes at 227° F. the compound containing 0.02 parts of cadmium oxide is well cured but the one containing 0.05 parts of cadmium oxide is undercured. In 60 minutes at 227° F. all three compounds are well cured. When vulcanization is conducted at 259° F. we find that cadmium oxide has a slight retarding effect. However, even a compound containing 0.05% of cadmium oxide is well cured in 30 minutes at 259° F., the physical properties being practically the same as those of the compound containing no retarding agent at all.

The examples given above illustrate the effect of adding cadmium compounds to a wide variety of different types of rubber compounds.

Milling tests show that the compounds containing the new retarding agents as cadmium oxide, cadmium oleate, cadmium acetate and cadmium hydroxide have much less tendency to scorch during the milling process than has the compound containing no retarding agent. This effect is not susceptible of mathematical expression but can readily be observed by anyone who is experienced in the milling of rubber. The fact that these cadmium compounds retard vulcanization at 227° F. also clearly indicates that they tend to prevent scorching during milling, calendering, etc.

It is obvious from this discovery that there are a multitude of cadmium compounds which can be used in place of the preferred compounds enumerated above. In fact, the cadmium salts of most acids may be employed, as, for example, cadmium stearate which gives the same results as cadmium oleate, and cadmium sulfate, which, although it is less effective than the cadmium salts of weak acids, when used in somewhat larger amounts fully answers the purposes of the invention. It is quite clear from my experience that any cadmium compound which has the faculty of reacting with hydrogen sulfide or other forms of labile sulfur under the conditions encountered in a rubber mix, will prevent scorching when used in conjunction with accelerators of the type of tetramethylthiurammonosulfide.

The amount of cadmium oxide or other cadmium compound normally required is approximately that used in the experiments described above, that is, about one-tenth as much cadmium oxide as of tetramethylthiurammonosulfide or a molecularly equivalent amount of such other cadmium compound as it may be desired to use. The proportion used, however, may vary up or down from that amount over rather wide limits, depending upon the nature of the other ingredients of the compound and the temperature at which it is desired to vulcanize it.

As many apparently widely different embodiments of this invention may be made without departing from the spirit and scope thereof, it is to be understood that I do not limit myself to the foregoing examples or description except as indicated in the following patent claims:

I claim:

1. The process of treating rubber which comprises subjecting a rubber mix containing an accelerator of the class consisting of compounds containing the group

and a cadmium compound which is adapted to react with hydrogen sulfide and other forms of labile sulfur to conditions which would tend to cause scorching in the absence of said retarding agent.

2. The process of treating rubber which comprises subjecting a rubber mix (containing sulfur, an accelerator of the class consisting of compounds containing the group

and a retarding agent of the group consisting of cadmium oxide, cadmium hydroxide and the cadmium salts of the fatty acids) to conditions which would tend to cause scorching in the absence of said retarding agent.

3. The process of treating rubber which comprises subjecting a rubber mix (containing sulfur, an accelerator of the substituted thiurammonosulfide type and a retarding agent of the group consisting of cadmium oxide, cadmium hydroxide and the cadmium salts of the fatty acids) to conditions which would tend to cause scorching in the absence of said retarding agent.

4. The process of treating rubber which comprises subjecting a rubber mix (containing sulfur, an accelerator of the substituted thiurammonosulfide type and a compound of the class consisting of cadmium oxide, cadmium hydroxide, cadmium stearate and cadmium oleate) to conditions which would tend to cause scorching in the absence of said cadmium compound.

5. The process of treating rubber which comprises subjecting a rubber mix (containing sulfur, tetramethylthiurammono-sulfide and a retarding agent of the group consisting of cadmium oxide, cadmium hydroxide and the cadmium salts of the fatty acids) to conditions which would tend to cause scorching in the absence of said retarding agent.

6. The process of vulcanizing rubber which comprises subjecting a rubber mix (containing sulfur, an accelerator of the substituted thiurammonosulfide type and a retarding agent of the group consisting of cadmium oxide, cadmium hydroxide and the cadmium salts of the fatty acids) to conditions which would tend to cause scorching in the absence of said retarding agent and thereafter heating to a sufficiently high temperature to effect vulcanization.

7. A rubber product obtained by subjecting a mix (containing sulfur, a substituted thiurammonosulfide and a retarding agent of the group consisting of cadmium oxide, cadmium hydroxide and the cadmium salts of the fatty acids) to conditions which would tend to cause scorching in the absence of said retarding agent and subsequently vulcanizing the compound.

8. A rubber product obtained by subjecting a mix (containing sulfur, tetramethylthiurammonosulfide and a retarding agent of the group consisting of cadmium oxide, cadmium hydroxide and the cadmium salts of the fatty acids having between two and eighteen carbon atoms) to conditions which would tend to cause scorching in the absence of said retarding agent and subsequently vulcanizing the compound.

9. The product of claim 8, said product being heated to a temperature not over 227° F. prior to the vulcanizing operation.

In testimony whereof, I affix my signature.

ERNEST R. BRIDGWATER.